United States Patent
Petty et al.

(10) Patent No.: US 6,308,073 B1
(45) Date of Patent: Oct. 23, 2001

(54) MOBILE STATION LOCATING AND TRACKING SYSTEM AND METHOD

(75) Inventors: John H. Petty; Sherman L. Gavette, both of Colorado Springs, CO (US)

(73) Assignee: Xircom Wireless, Inc., Colorado Springs, CO (US)

( * ) Notice: Subject to any disclaimer, the term of this patent is extended or adjusted under 35 U.S.C. 154(b) by 0 days.

(21) Appl. No.: 09/282,281

(22) Filed: Mar. 31, 1999

Related U.S. Application Data (63) Continuation of application No. 08/893,938, filed on Jul. 15, 1997, now Pat. No. 5,901,358.

(51) Int. Cl.[7] .................................................. H04B 7/005
(52) U.S. Cl. ........................ 455/456; 455/517; 455/561
(58) Field of Search .................................. 455/456, 457, 455/524, 525, 561, 67.6

(56) References Cited

U.S. PATENT DOCUMENTS

| | | | |
|---|---|---|---|
| 5,208,756 | * 5/1993 | Song | 455/456 |
| 5,293,645 | * 3/1994 | Sood | 455/456 |
| 5,363,373 | * 11/1994 | Nakahara et al. | 455/67.6 |
| 5,444,698 | * 8/1995 | Kito | 455/67.6 |
| 5,732,354 | * 3/1998 | MacDonald | 455/456 |
| 5,970,413 | * 10/1999 | Gilhousen | 455/456 |

* cited by examiner

Primary Examiner—Daniel Hunter
Assistant Examiner—Thuan T. Nguyen
(74) Attorney, Agent, or Firm—Lyon & Lyon LLP (57) ABSTRACT

Systems and methods for locating a remote station within an area of a wireless communications network without using a global positioning system. Communications are established between a remote station and a plurality of base stations using separate time slots within at least one over-the-air loop. Propagation delay times associated with signals transmitted or received within the time slots are determined, and one or more possible locations of the remote station are identified based upon the determined propagation delay times.

18 Claims, 4 Drawing Sheets

MOBILE STATION LOCATING AND TRACKING SYSTEM AND METHOD

The present invention is a continuation of the U.S. application Ser. No. 08/893,938 filed on Jul. 15, 1997, which is now U.S. Pat. No. 5,901,358.

FIELD OF THE INVENTION

The present invention relates generally to wireless telecommunications systems and, more particularly, to wireless telecommunications systems that are capable of determining and/or tracking the precise location of a remote or mobile station, and to methods used within such systems. In addition, the present invention is directed to wireless telecommunications systems and methods for providing the speed and direction of movement of a mobile station.

BACKGROUND OF THE INVENTION

Mobile and cellular telephones have come into common use today. Such equipment enables the provision of convenient telecommunications services to persons traveling in a vehicle or otherwise remote from traditional stationary telephone equipment.

To provide these services, cellular and mobile wireless communications systems generally employ a number of remote stations (often referred to as mobile stations or customer premises radio units) and one or more stationary units or base stations. The remote stations generally have the ability to establish communications links with the base stations, and the base stations are capable of establishing one or more communications links with a public service telephone network (PSTN), thus enabling the user of a remote station to communicate remotely with conventional telephones or other remote stations connected to the network.

The remote station typically comprises a cellular phone including a battery-operated transmitter/receiver, or a mobile phone, a similar device which is fixed to an object, usually an automobile. However, it is not uncommon, particularly in rural communities, for remote units to comprise stationary customer premises radio units (CPRUs). To initiate a telephone call on the public service telephone network (PSTN), a remote station will generally establish a communications link with a base station and the base station, often via a base station controller, cluster controller or control station, will establish a communications link with the public service telephone network. An exemplary wireless telecommunications system is described in U.S. Pat. No. 5,497,424, entitled "Spread Spectrum Wireless Telephone System," which is hereby incorporated by reference.

While providing convenient telephone services, present wireless telecommunications systems have limitations. Unlike traditional stationary telephones, in which the location of the telephone is inherent in the telephone number assigned to it, remote stations operating within a wireless environment do not have such information available. Moreover, because remote stations often have the ability to move and to establish communications with many base stations as they move through a network of communications cells, absent the use of global positioning systems (GPSs), there is presently no way to know the precise location of a remote station, unless the user of the remote station is somehow able to provide that information.

For example, if a mobile station user needs emergency assistance, the user may use the mobile station to call 911 or otherwise seek help. If the user knows his or her precise location, that information may be conveyed to emergency personnel allowing aid to be rendered fairly quickly. If, however, the user is lost or is somehow incapacitated, for example, if the user is rendered unconscious after initiating a call, information concerning the user's location may not be obtained, substantially increasing the likelihood that the user will not receive the needed emergency assistance.

In addition, if a remote station is lost or stolen, there is presently no practical way for the owner of the remote station or the wireless network service provider to locate the remote station.

Thus, there is a substantial need for a wireless telecommunications system that is capable of determining the precise location of a remote station.

SUMMARY OF THE INVENTION

The present invention is directed to a wireless telecommunications system having the ability to identify or determine the location of a remote unit or remote station, and to methods used within such systems.

In one innovative aspect, the present invention is directed to a wireless telecommunications system having the ability to determine the location of a remote station using principals of triangulation or intersecting spheres. For example, to determine the location of a remote station, a wireless telecommunications system in accordance with the present invention may determine the propagation delays in signals transmitted between the remote station and a plurality of base stations, convert the respective propagation delay times to corresponding distances, and use principals of triangulation or intersecting spheres to locate the remote station.

In one preferred embodiment, a remote station may reference a base station selection table, as is done during conventional handoff procedures; determine which base stations (preferably three) are likely to be within a range of communication of the remote station; and establish communications links with the identified base stations. The base stations may then determine the propagation delays inherent in transmissions between the remote station and the respective base stations, and provide the propagation delay data back to the remote station. The remote station may then use the determined propagation delays to calculate distances to the respective bases stations. The calculated distances then may be transmitted to one or more of the respective base stations in the form of an "assist request" message and, thereafter, may be conveyed to a locator unit or to emergency personnel. Alternatively, the determined distances or propagation delays may be used by the remote station to identify the position of the remote station, and the position information may be forwarded on to one of the respective base stations. Irrespective of the specific hardware that performs the position determination, the distances from the respective base stations may be plotted as radii from the locations of the base stations within a digital map of the relevant area, and principals of triangulation or intersecting spheres may be used to, thereafter, identify the location, or possible locations, of the remote station.

Those skilled in the art will understand that the format of the information is not an issue, as the requisite calculations may be performed using time (propagation delay) or distance information. It will also be understood that, depending upon the design criteria relevant to a given wireless telecommunications system, the propagation delay and/or distance calculations may be done within the remote station, the base stations or further back within the wireless communications system, for example, within a base station controller, cluster controller, or enhanced services processor.

Additional information, such as the speed of the mobile station and the direction in which it is moving, is also obtainable in accordance with the present invention. In one presently preferred embodiment, a series of signals may be communicated between the mobile station and the base stations, as already described, with each series providing the location of the mobile station at a particular point in time. Thus, the location of the mobile station as a function of time may be determined, which is then converted into desired information such as speed and direction.

Accordingly, it is an object of the present invention to provide a wireless communications system that is capable of determining the location of a remote station or remote unit without the use of a global positioning system (GPS)

It is another object of the present invention to provide improved methods for locating a remote station within an area of a wireless communications network.

It is still another object of the present invention to provide a system and/or method for tracking and/or determining the direction and rate of travel of a mobile station within an area of a wireless communications system.

Other objects and features of the present invention will become apparent from consideration of the following description taken in conjunction with the accompanying drawings.

DETAILED DESCRIPTION OF PREFERRED EMBODIMENTS

Figure 1:
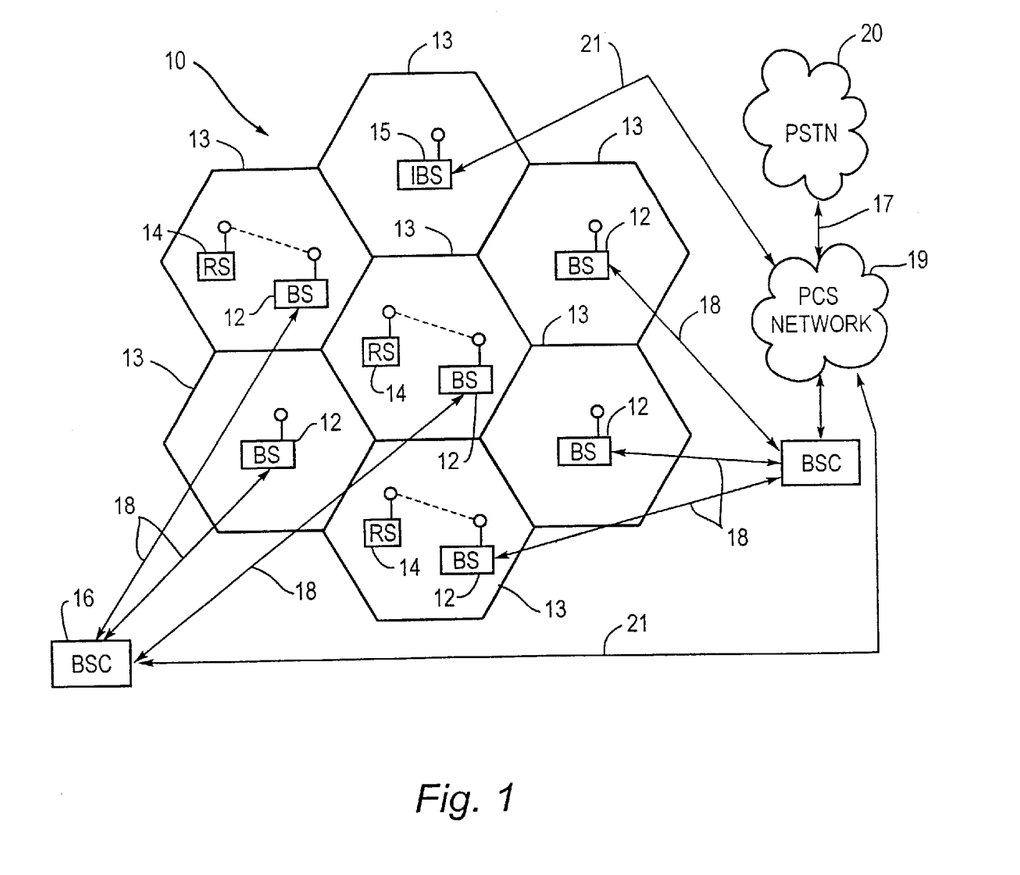
FIG. 1 is a block diagram of an exemplary wireless communication network that is coupled to a public service telephone network (PSTN).

Turning now to the drawings, FIG. 1 provides an illustration of an exemplary wireless communications network 10 that is capable of locating a mobile station without the use of a global positioning system (GPS). As shown, the wireless communications system 10 includes a plurality of base stations 12, which may include one or more intelligent base stations 15, wherein each base station 12 and intelligent base station 15 is located within a respective geographic cell defined by cell boundaries 13. A plurality of independent (activated) remote stations 14 are distributed throughout the network 10, with multiple remote stations 14 typically located in a particular geographic cell at any given instant. The remote stations 14 may be mobile handsets or fixed customer premises radio units.

The base stations 12, the intelligent base station 15 and the remote stations 14 each preferably comprise a radio transmitter and receiver, and preferably communicate with one another using a combination of time division multiple access ("TDMA"), frequency division multiple access ("FDMA"), and code division multiple access ("CDMA") transmission techniques, respectively, preferably by employing a spread spectrum encoding format. For example, TDMA is preferably used to separate users within each geographic cell location. To provide greater area of coverage, or to provide greater capacity for densely populated regions, multiple or "sectorized" cells may be deployed using FDMA, thus separating cells by frequency. Further, to permit multi-cell deployments in a given region, CDMA may be used for each "RF link," (i.e., each over-the-air radio frequency signal link), in order to reduce co-channel interference between nearby cells using the same RF carrier frequency. Spread spectrum may advantageously improve system response to RF channel impairments. Both FDD and TDD may be employed with any of these multiple access techniques.

The respective base stations 12 and intelligent base station 15 are used to perform the requisite over-the-air radio transmission and reception to remote stations 14 located within their respective cell areas, and contain the equipment needed to communicate with the respective remote stations. In this regard, a base station 12 supports the over-the-air, terrestrial, and signaling links, respectively, necessary for fully linking a remote station 14 to an overlay network 20, such as, e.g., a public service telephone network ("PSTN") through a personal communications switching network infrastructure 19 via interface 17.

The base stations 12 preferably are connected, via back haul lines 18, to a respective base station controller ("IBSC") 16, which preferably controls the two-way transmissions of a plurality of base stations 12 in order to more efficiently provide certain operations such as, e.g., call handoffs between base stations, bearer data encoding and decoding, as well as general OAM&P ("operations, administration, maintenance & provisioning") support functions.

An intelligent base station 15 is intended herein to describe a base station which incorporates the features of both a standard base station 12 and a base station controller 16, respectively, in a single unit.

The respective base station controllers 16 and intelligent base stations 15, in turn, are connected to the overlay network 20 via further back haul lines 21. In a typical preferred embodiment, an overlay network 20 will be connected to a multitude of base stations 12, either by way of a (smaller) number of base station controllers 16 or directly, where intelligent base stations 15 are employed. The respective back haul lines 18 and 21 are preferably dedicated (e.g., private or leased public), two-way DS0, DS1 or DS3 level facilities, depending on the particular traffic load requirements of the specific portion of the communication network 10.

To communicate with multiple remote stations 14 in its respective geographic cell, each base station 12 and intelligent base station 15 preferably employs an over-the-air loop comprising a number of individual air channels, or "time slots", wherein each time slot may be used by a remote station 14 to communicate with the respective base station 12 and intelligent base station 15. In accordance with a preferred communication protocol, an FDD protocol such as that embodied in the GSM standards may be employed. In accordance with another preferred communication protocol, a time division duplexing ("TDD") transmission mode technique is preferably employed, whereby both downlink—i.e., in the base station to remote station transmission direction—and uplink—i.e., in the remote station to base station transmission direction—transmissions are carried over a common communication frequency path by employing time intervals for each respective signal transmission within a given time slot.

For example, in an exemplary preferred network embodiment employing a TDMA/TDD frame and time slot structure based on a 20 millisecond (ms) over-the-air loop and employing 2.5 Mega "chip" per second (Mcps) transmission rate, the 20 ms over-the-air loop is equally divided between 16 full duplex channels, with each resulting time slot channel being capable of supporting 9.6 Kbps full duplex digital data transmission between the respective base and remote stations. The first portion of each time slot channel is preferably allocated for a remote station frame transmission, and the second portion is preferably allocated for a base station frame transmission, respectively. After each respective base or remote frame transmission, a small portion of the time slot is preferably allocated to allow sufficient guard time for the transmitted signal to propagate back and forth to the respective receiver, e.g., based on the projected maximum geographic cell radius. In other words, even if there were perfect synchronization between respective base and remote station transmission intervals, a guard time is still preferred to minimize the possibility of received and transmitted signals overlapping in time due to the varying transmission distances and atmospheric conditions within the geographic cell location.

Preferably, any time slot in the over-the-air loop of a given base station 12 or intelligent base station 15 that is not already seized by a remote station 14 may contain a general poll command message transmitted by the respective base station 12 or intelligent base station 15 in that time slot's base station transmit interval. To acquire a time slot, a remote station 14 responds to a received general poll message in a remote station transmit interval. Upon receiving the response, the respective base station 12 or intelligent base station 15 may send a specific poll message in the next appearance of the same time slot in the over-the-air loop, which preferably includes a time slot (or time slots) assignment for communication between the remote station 14 and the base station 12 or intelligent base station 15, which may or may not be the same time slot used to transmit the general poll command message.

Figure 2:
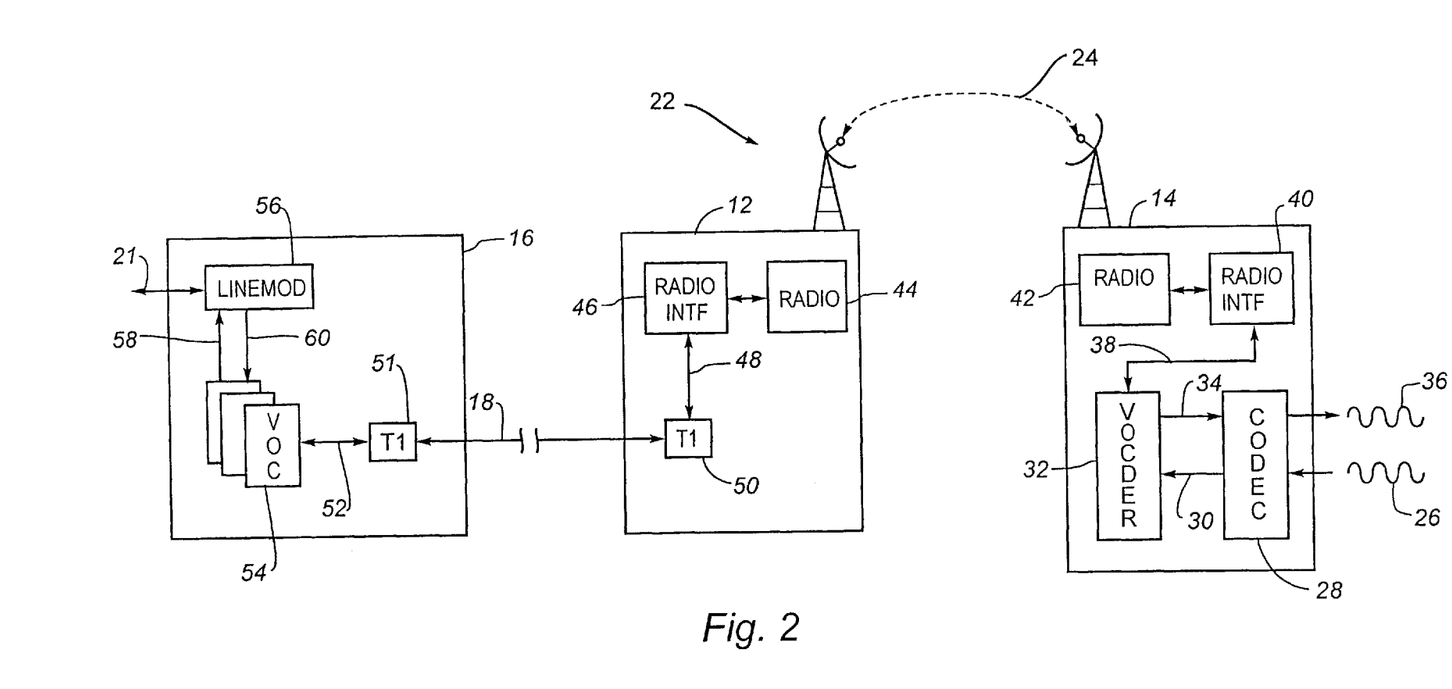
FIG. 2 is a block diagram of an exemplary end-to-end voice path in an exemplary link between respective remote and base stations of a preferred wireless communication network.

Referring to FIG. 2, in a manner described and disclosed in U.S. patent application Ser. No. 08/749,105, filed on Nov. 14, 1996, and owned by the assignee of the present application, which is fully incorporated by reference herein, a synchronized communication path 22 between a respective remote station 14 and a respective base station 12 is preferably acquired and maintained via an over-the-air (OTA) time slot 24 of the over the air loop of the respective base station 12. In particular, the transmission timing of the respective base station 12 is synchronized to the overlay network 20, and the respective transmission timing of the remote station 14 is synchronized to the base station 12, respectively, so that periodic voice frames may thereafter be transmitted in each direction over the acquired time slot 24 during the respective base and remote station transmit intervals. A general description of a voice path through the communication link 22 follows, where, for purposes of uniformity, transmission in the remote station-to-base station direction is referred to herein as "uplink" transmission, and transmission in the base station-to-remote station direction is referred to as "downlink" transmission.

In the uplink direction the remote station 14 transmits an analog (voice) signal 26, which is preferably converted by a CODEC circuit 28 into an uplink PCM data stream 30, preferably at a basic digital telephony rate of 9.6 Kbps. The uplink PCM data stream 30 is input into a remote station vocoder 32, which preferably encodes the PCM data in accordance with a selected voice compression algorithm, and then transmits the encoded PCM data in a series of respective uplink voice frames over a full duplex bus 38 to a remote station radio interface circuit 40, wherein a single voice frame is transmitted from the radio interface circuit 40 to the radio 42 during each remote station transmit interval of the respective acquired OTA time slot 24.

Likewise, in the downlink direction, respective downlink voice frames are transmitted from the remote station radio 42 to the radio interface circuit 40 during each base station transmit interval of the respective acquired OTA time slot 24. The encoded data is then transferred from the radio interface circuit 40 to the vocoder 32 via bus 38. The respective downlink voice frames are decoded by the vocoder 32 into a downlink PCM data stream 34, preferably having the same transmission rate as the outgoing PCM data stream 30—i.e., 9.6 Kbps. The downlink PCM data stream 34 is then converted into an analog (voice) signal 36 by the CODEC 28, which is received by the operator (not shown).

Figure 3:
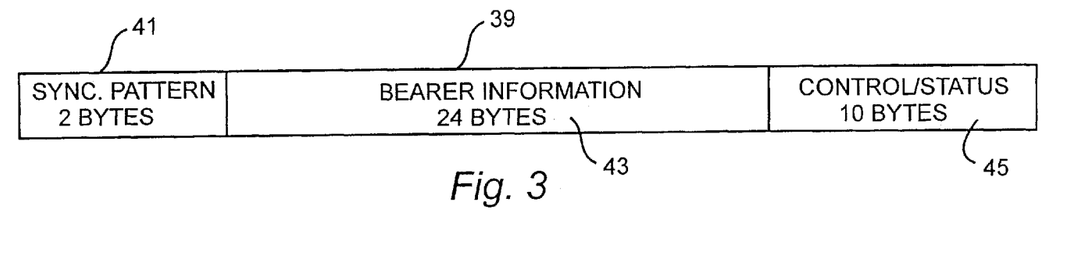
FIG. 3 is a block representation of a preferred voice frame according to a preferred remote station and base station serial interface.

More particularly, referring to both FIG. 2 and FIG. 3, the respective uplink and downlink voice frames transmitted over bus 38 are configured in accordance with a preferred 14.4 Kbps to 16 Kbps serial interface defined for transmission between the vocoder 32 and radio interface circuit 40, respectively. In accordance with this preferred serial interface, each voice frame 39 begins with a two byte sync pattern 41, which is preferably selected so as to not be likely to represent bearer data, such as, e.g., preferably C3 hex (11000011) and A5 hex (10100101). The sync pattern 41 is followed by twenty-four bytes of bearer information 43—i.e., for a bearer data transmission rate of 9.6 Kbps in a preferred network employing a 20 msec base station polling loop equally divided between 16 full duplex OTA channels. The bearer information bytes 43 are followed by ten to fourteen bytes of (non-compressed) control and status bytes 45, which are used for sending overhead and system level information between the respective remote station vocoder 32 and radio interface circuit 40. It may be noted that the data transmitted between a base station and a remote station within a typical over-the-air loop will preferably comprise a 128 bit (16 byte) preamble or sync sequence, 2–3 bytes of header information, 1 auxiliary data byte, 24 bytes of bearer data and 2 bytes of forward error correction (FEC) data.

In a preferred embodiment, the bearer information 43 includes both encoded voice and error correction data in accordance with the selected algorithm employed by the vocoder 32. In alternate preferred embodiments, the bearer information bytes 43 transmitted between the vocoder 32 and radio interface circuit 40 only include encoded voice, with the error correction information added to uplink voice frames or deleted from downlink voice frames, respectively, at the remote station radio interface circuit 40. In either case, however, the preferred serial interface includes a twenty-four byte bearer information field 43 in each voice frame 39 transmitted in either direction between the respective vocoder 32 and radio interface circuit 40. In an alternative preferred embodiment, the control/status information may precede the bearer information or may be interspersed within a given frame.

In the uplink direction, the sync pattern bytes 41 and control and status bytes 45, respectively, are preferably stripped from each voice frame at the remote station radio interface circuit 40, with the twenty-four bytes of bearer data 43 transmitted over OTA slot 24 by a remote station radio 42 during the respective remote station transmit interval. Likewise, in the downlink direction, a respective twenty-four bytes of bearer data (also designated as "43") is preferably received by the remote station radio 42 during each base station transmit interval. The received (downlink) bearer data bytes 43 are forwarded to the remote station radio interface circuit 40, which preferably appends the two byte sync pattern 41 in front of, and adds ten control and/or status data bytes 45 behind, respectively, the received bearer data bytes 43, to thereby form a complete downlink voice frame 39 in accordance with the defined serial interface.

At the base station end of the communication link 22, a base station radio 44 receives the twenty-four bytes of uplink bearer data 43 transmitted from the remote station 14 over the OTA channel 24 during the respective remote station transmit intervals, and forwards the data to a base station radio interface circuit 46. The two byte sync pattern 41 is added in front of, and ten control and/or status data bytes 45 are appended behind, respectively, the received uplink bearer data bytes 43 from the remote station 14, to thereby reform a complete uplink voice frame.

The uplink voice frames 39 are transmitted over a duplex bus 48 from the base station radio interface circuit 46 to a T1 interface module 50, which relays the respective voice frames 39 over a backhaul facility 18 to a corresponding T1 module 51 located at a respective base station controller (BSC) 16 or other network subsystem. From the BSC T1 module 51, the uplink voice frames 39 are preferably forwarded over a BSC duplex bus 52 to an assigned vocoder 54, which is one of several vocoders located at the BSC 16. The respective uplink voice frames 39 are decoded by the vocoder 54 into a (non-compressed) PCM data stream 58 having the same transmission rate as the remote station PCM data stream 30—i.e., preferably at 64 Kbps. The PCM data stream 58 is then preferably transmitted to a respective BSC line module 56 for further routing, e.g., over backhaul facility 21 to the overlay network 20.

In the downlink direction, a downlink PCM data stream 60, which carries downlink bearer information intended for the respective remote station 14 via communication link 22, is transmitted from the BSC line module 56 to the respective vocoder 54. The vocoder 54 encodes the downlink PCM data from signal 60 in accordance with a selected voice compression algorithm and outputs the encoded data in a series of respective downlink voice frames 39, which are transmitted over duplex bus 52 to the BSC T1 module 51. The BSC T1 module 51 relays the downlink voice frames 39 to the respective base station T1 module 50, via the backhaul facility 18. From the base station T1 facility 50, the downlink data frames 39 are forwarded over bus 48 to the base station radio interface 46, which strips off the respective sync pattern bytes 41 and control and status bytes 45, with the twenty-four bytes of bearer data 43 of each downlink frame transmitted over OTA slot 24 during the respective base station transmit interval. The control and status bytes 45 are monitored by the protocol processor and appropriate control traffic messages are sent as part of the protocol (e.g. DTMF).

To initially acquire and thereafter maintain vocoder synchronization, preferably after a synchronized OTA channel 24 has been acquired, the respective remote and base station vocoders 32 and 54 will each send respective uplink and downlink voice frames 39 during the respective remote and base station transmit intervals of the acquired time slot. Both vocoders 32 and 54 scan the respective incoming data to detect the sync pattern 41. Upon detecting the sync pattern bytes 41, the respective vocoder 32 or 54 processes the ensuing thirty-four bytes of serial data as the initial bearer and control information, respectively, of a respective new incoming voice frame 39.

Figure 4:
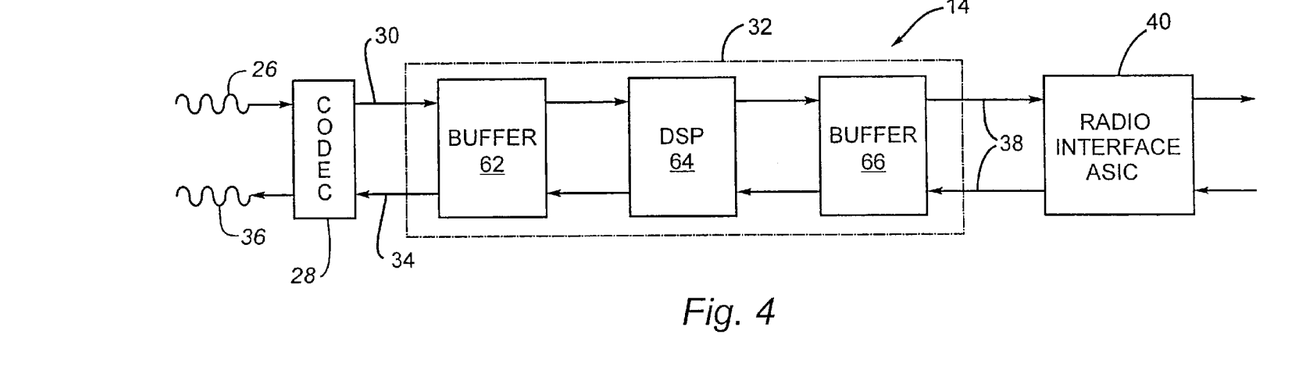
FIG. 4 is a block diagram of the voice path in a preferred remote station.

More particularly, referring to FIG. 4, the remote station vocoder 32 includes a first (non-encoded) data interface buffer 62, a digital signal processor ("DSP") 64 and a second (encoded) data interface buffer 66, respectively. Buffer 62 stores PCM data to be encoded from data stream 30 and recently developed PCM data to transmit as data stream 34, buffer 66 stores bearer data received from the radio interface circuit 40 to be decoded and encoded data to be transmitted to the radio interface circuit 40, and the DSP 64 performs the actual encoding and decoding, respectively.

Upon initially detecting the sync pattern 41, the remote station vocoder 32 resets respective counters (not shown) associated with the buffers 62 and 66, and begins a new voice frame cycle. In the "encode" direction, a frame's worth (the actual number of bytes or bits, in the frame will vary depending on the compression ratio by the vocoder) of (non-compressed) data from PCM data stream 30 will be acquired in buffer 62, a frame's worth (again the actual number of bytes or bits, in the frame will vary depending on the compression ratio by the vocoder) of (non-compressed) PCM data previously stored in buffer 62 will be received and encoded by DSP 64 into twenty-four bytes of bearer data, and twenty-four bytes of previously encoded bearer data is delivered from the buffer 66 to the remote station radio interface 40, respectively, along with the newly inserted sync pattern 41 and status bytes 45. In the "decode direction," the next serial clock count will deliver the first bit of bearer data of the respective incoming voice frame 39 into buffer 66. Once the bearer data bytes 43 are completely received into buffer 66, it is decoded by the DSP 64 and then transmitted serially as downlink PCM signal 34 to the CODEC 28 from buffer 62.

After the initial voice frame 39 is processed, the vocoder 32 looks for the sync pattern 41 to appear again, i.e., immediately following the initial frame 39 at the next base station transmit interval of the acquired time slot 24. If so, vocoder synchronization is established at the remote station 14 end of communication path 22. This process is repeated at each successive time slot interval, until the sync pattern 41 is not detected in its expected frame sequence location, indicating that a synchronization problem has occurred. When this occurs, the vocoder 32 returns to scanning the incoming data for the sync pattern 41 to appear at any time. The remote station vocoder 32 preferably mutes its non-compressed output while scanning for the sync pattern 41, or whenever a synchronization error is detected, e.g., by voiding the decoded downlink data rather than delivering it to the CODEC 28. The remote station radio interface 40 also preferably mutes its downlink voice frame transmissions to the vocoder 32 via a control bit whenever a synchronization change is required. To mask possible cases where the synch pattern 41 might occur randomly in the middle of a voice frame 39 synchronization changes are not made unless three consecutive frames indicate that the synchronization is not correct.

Figure 5:
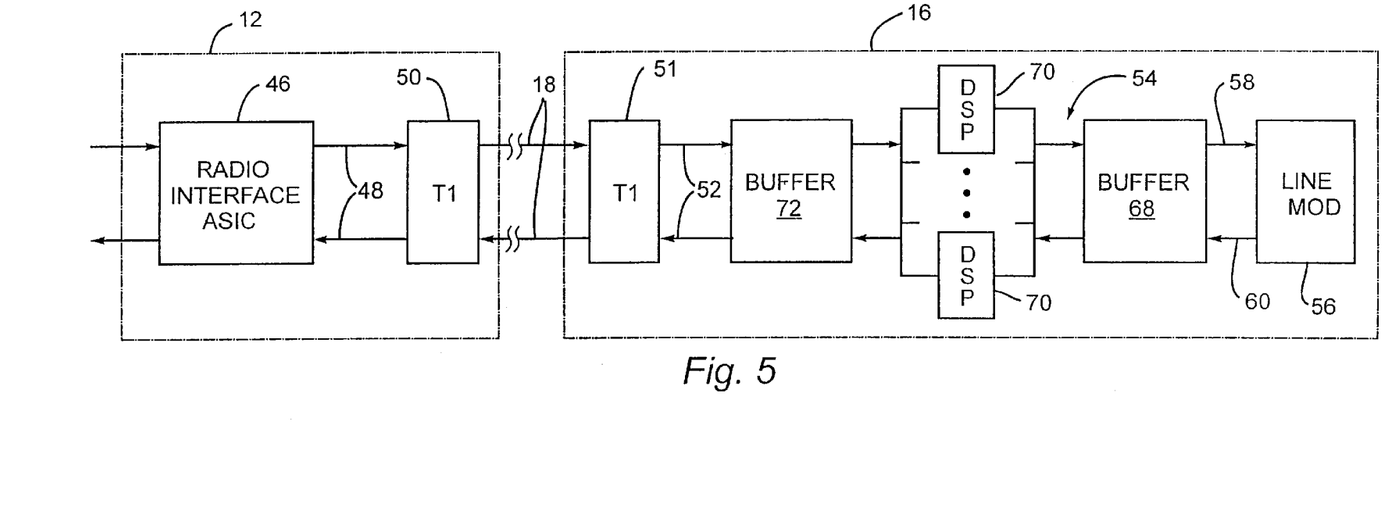
FIG. 5 is a block diagram of the voice path through a preferred base station and connected base station controller (or transcoder unit), respectively, linked by a digital back-haul facility.

Referring to FIG. 5, the vocoder 54 at the BSC 16 includes a first (non-encoded) data interface buffer 68 connected to the line modules 56, a plurality of DSPs 70 and a second (encoded) data interface buffer 72 connected to the BSC T1 module 51, respectively. Buffer 68 stores PCM data to be encoded from data stream 60 and recently decoded PCM data to transmit as data stream 58, buffer 72 stores bearer data received from the base station radio interface circuit 46 to be decoded and recently encoded data to be transmitted to the radio interface circuit 46, and a selected DSP from the plurality of DSPs 70 performs the actual encoding and decoding, respectively, of the voice path data associated with the communication path 22.

Upon initially detecting the sync pattern 41, the selected DSP 70 resets respective counters (not shown) associated with buffers 68 and 72, and begins a (base station) new voice frame cycle. In the encode direction, a frame's worth (the actual number of bytes or bits, in the frame will vary depending on the compression ratio by the vocoder) of (non-compressed) data from PCM data stream 60 will be acquired in buffer 68, a frame's worth (the actual number of bytes or bits, in the frame will vary depending on the compression ratio by the vocoder) of (non-compressed) PCM data previously stored in buffer 68 will be received and encoded by the respective DSP 70 into twenty-four bytes of bearer data, and twenty-four bytes of previously encoded bearer data is delivered from the buffer 72 to the T1 module 51, respectively, along with the newly inserted sync pattern 41 and status bytes 45. In the decode direction, preferably the next serial clock count will deliver the first bit of bearer data of the respective incoming voice frame 39 into buffer 72. Once the bearer data bytes 43 are completely received into buffer 72, the bearer data is decoded by the DSP 70 stored in buffer 68 and transmitted serially as downlink PCM signal 58 to the line module 56. Because the vocoder 54 is preferably located remotely from the respective base station 12, i.e., over the backhaul T1 facility 18, an extra delay of up to one over-the-air loop cycle, e.g., 20 msec is preferred for the transmission of the voice frames 39 in each direction between the base station radio interface 46 and the respective vocoder DSP 70.

Thus, methods and network architectures for the acquisition and maintenance of synchronization between vocoders on both ends of an established communication link in a remote communication network have been disclosed. For example, in a network employing a 5 Mcps transmission rate with a 20 ms over-the-air loop equally divided between 32 full duplex channels, each resulting time slot channel is capable of supporting 9.6 Kbps full duplex transmission between the respective base and remote stations. In this case, a bearer information field 43 of twenty bytes per voice frame 39 is preferably employed instead of twenty-four bytes.

Figure 6:
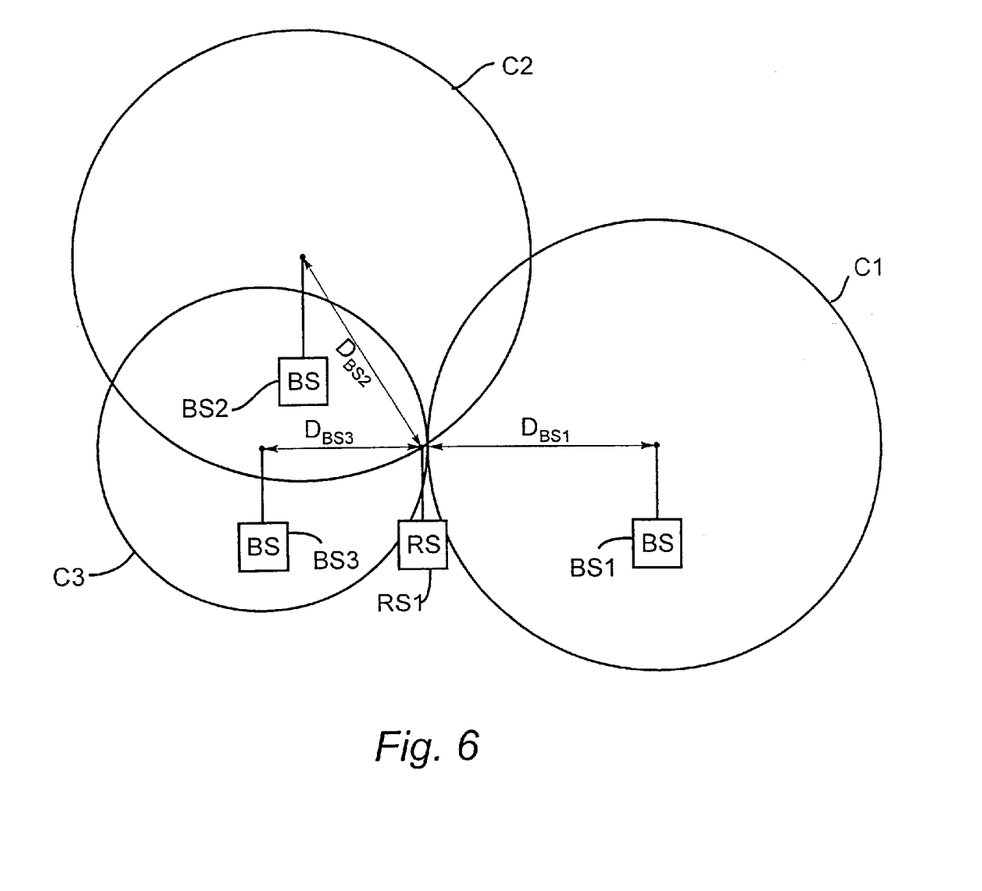
FIG. 6 is a block diagram illustration how principals of triangulation and intersecting spheres may be used to locate a remote station in accordance with a preferred form of the present invention.

Turning now to FIG. 6, using a wireless telecommunications network such as that described above, it is possible to locate a remote station within the area of the network by (1) enabling the remote station to establish communications with a plurality of base stations (preferably, three), i.e., by acquiring a plurality of OTA time slots with distinct base stations; (2) determining the propagation delays in the signals transmitted between the remote station and the respective base stations; and (3) using the determined propagation delays or corresponding distances together with principals of triangulation or intersecting spheres to determine the location of the remote station.

For example, if it is determined by analyzing the transmissions between remote station RS1 and base stations BS1, BS2 and BS3 that the remote station RS1 is 2 km from base station BS1, 2 km from base station BS2, and 1.5 km from base station BS3, the determined distances may be plotted as radii of circles C1, C2, and C3 surrounding the respective base stations BS1, BS2 and BS3. The common intersection point IP of the respective plotted circles C1, C2 and C3 will correspond to the location of the remote station RS1.

Those skilled in the art will appreciate that, where only two base stations may be contacted, the above described process will reveal two possible locations for the remote station RS1.

The determination of the propagation delay times of the transmissions between the remote station RS1 and respective base stations BS1, BS2 and BS3 may be determined as follows. Because each base station employs, in a preferred embodiment, a 20 ms over-the-air loop, each base station BS1, BS2 and BS3 knows that it should receive sync signals from the remote station RS1 every 20 ms and, thus, may determine the signal propagation delay times $PDT_m$ by measuring the amount of time between a point when a sync signal should be received (i.e., a predicted time of sync signal reception based on a 20 ms over-the-air loop) and the time that a sync signal is actually received. It will be noted that the measured propagation delay time $PDT_m$ will be twice as long as the time required for a signal to travel from the remote station RS1 to a respective base station BS1, BS2 or BS3, and that to determine the distance between the remote station RS1 and a respective base station, the measured propagation delay time $PDT_m$ will be divided by 2.

Thus, the distance $D_{BSX}$ between the remote station RS1 and a respective base station may be calculated as follows:

$$D_{BSX} = C \times (PDT_m/2)$$

where the value C corresponds to the speed of light ($3 \times 10^9$ m/s). Thus, in the example above, if the measured propagation delay time $PDT_m$ for signals transmitted between the remote station RS1 and base station BS1 corresponds to 2.66 μs, it would be determined that the distance from the remote station RS1 to base station BS1 is approximately 2 km. The distance calculations may be performed by the remote station RS1, the individual base stations BS1, BS2 and BS3, or by some other back line hardware, such as a base station controller (not shown) or special services processor (not shown). In the event that the remote station RS1 performs the distance calculations, the base stations BS1, BS2 and BS3 may provide the measured propagation delay time data to the remote station via designated status or control bytes in the transmitted data frames.

Finally, once the distances from the respective base stations BS1, BS2 and BS3 are determined, those distances may be plotted as radii on a digital map representing the area of the base stations BS1, BS2 and BS3, and principals of triangulation or intersecting spheres may be used (in the manner described above) to identify the precise location, or possible locations (depending upon the number of base stations contacted), of the remote station RS1.

Those skilled in the art will appreciate that the above described computations may be readily performed in the digital signal processing (DSP) circuits provided in the remote stations 14, base stations 12 and intelligent base stations 15 described above.

Thus, it can be seen that a wireless communication system in accordance with the present invention may locate remote stations without the use of global positioning systems (GPSs), and that the systems and methods of the present invention provide a cost effective means for locating base stations in the event of an emergency.

In addition, those skilled in the art will understand that by plotting the location of a remote station as a function of time, it is possible to identify not only the location of a remote station, but also the rate and direction of travel of the remote station. This ability provides law enforcement with a useful means for tracking stolen remote station units.

Finally, it will be understood that the propagation delay, distance and location calculation functions may be performed anywhere within the wireless communications network and, thus, the described methods are not limited to being performed within a remote station. In short, depending upon the design criteria relevant to a given wireless telecommunications system, the propagation delay and/or distance calculations may be done within the remote station, the base stations or further back within the wireless communications system, for example, within a base station controller, cluster controller, or enhanced services processor.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A wireless tracking system, comprising:
   a plurality of base stations;
   a remote station;
   each of said base stations and said remote station comprising a transmitter, a receiver and digital signal processing circuitry;
   at least some of said base stations further comprising propagation delay time calculating circuitry capable of determining the propagation delays in signals transmitted between said remote station and said at least some base stations; and
   either said remote station or at least one base station further comprising distance calculating circuitry capable of calculating the distance between said remote station to said at least some base stations at different points in time based upon said propagation delay times,
   wherein either said remote station or said at least some base stations further comprise rate determining circuitry capable of determining the rate of travel of said remote station based upon said locations of said remote station at said different points in time.

2. The wireless tracking system of claim 1, wherein either said remote station or said at least some base stations further comprise:
   location determining circuitry capable of determining the location of said remote station at said different points in time based upon said distances from said remote station to said plurality of base stations calculated at said different points in time.

3. The wireless tracking system of claim 1, wherein two or more remote stations are tracked simultaneously.

4. The wireless tracking system of claim 1,
   wherein said rate of travel of said remote station is plotted as a function of time.

5. A wireless tracking system, comprising:
   a plurality of base stations;
   a remote station;
   each of said base stations and said remote station comprising a transmitter, a receiver and digital signal processing circuitry;
   at least some of said base stations further comprising propagation delay time calculating circuitry capable of determining the propagation delays in signals transmitted between said remote station and said at least some base stations; and
   either said remote station or at least one base station further comprising distance calculating circuitry capable of calculating the distance between said remote station to said at least some base stations at different points in time based upon said propagation delay times,
   wherein either said remote station or said at least some base stations further comprise direction determining circuitry capable of determining the direction of travel of said remote station based upon said locations of said remote station at said different points in time.

6. The wireless tracking system of claim 5,
   wherein said direction of travel of said remote station is plotted as a function of time.

7. A method for tracking a mobile station, comprising:
   establishing communications between a mobile station and at least three base stations using signals sent between said mobile station and said at least three base stations;
   transmitting substantially synchronized signals from said at least three base stations to said mobile station at different points in time;
   calculating propagation delay times associated with signals sent between said mobile station and said at least three base stations at said different points in time;
   calculating distances from said mobile station to said at least three base stations at said different points in time using said propagation delay times calculated at said different points in time; and
   determining a rate of travel of said mobile station based upon said locations of said mobile station determined at said different points in time.

8. The method for tracking a mobile station of claim 7, further comprising:
   determining locations of said mobile station at said different points in time based upon said distances from said mobile station to said at least three base stations calculated at said different points in time.

9. The method for tracking a mobile station of claim 7, further comprising:
   tracking two or more mobile stations simultaneously.

10. The method for tracking a mobile station of claim 7, wherein said rate of travel of said mobile station is plotted as a function of time.

11. The method for tracking a mobile station of claim 7, wherein said base stations transmit additional signals that are not necessarily substantially synchronized which may be used for communications with other mobile stations.

12. A method for tracking a mobile station, comprising:
   establishing communications between a mobile station and at least three base stations using signals sent between said mobile station and said at least three base stations;
   transmitting substantially synchronized signals from said at least three base stations to said mobile station at different points in time;
   calculating propagation delay times associated with signals sent between said mobile station and said at least three base stations at said different points in time;
   calculating distances from said mobile station to said at least three base stations at said different points in time using said propagation delay times calculated at said different points in time; and
   determining a direction of travel of said mobile station based upon said locations of said mobile station determined at said different points in time.

13. The method for tracking a mobile station of claim 12, wherein said direction of travel of said mobile station is plotted as a function of time.

14. A wireless communications system, comprising:

a plurality of base stations;

at least one remote station;

each of said base stations and said at least one remote station including transmitter, receiver and digital signal processing circuitry for establishing and maintaining communications using signals sent within at least one over-the-air loop having an expected duration;

each of said base stations including processing circuitry for determining propagation delay times associated with said signals received during said at least one over-the-air loop, said propagation delay times being determined based at least in part upon a difference between said expected duration of said at least one over-the-air loop and a measured duration of said at least one over-the-air loop; and said at least one remote station including processing circuitry for calculating distances to said plurality of base stations based upon said propagation delay times.

15. The wireless communications network of claim 14, further comprising:

processing circuitry for determining at least one possible location for said at least one remote station based upon said calculated distances.

16. A wireless communication network comprising:

a plurality of base stations;

at least one remote station;

each of said base stations and said at least one remote station including transmitter, receiver and digital processing circuitry for establishing and maintaining communications using signals sent within at least one over-the-air loop having an expected duration; and each of said base stations including processing circuitry for determining propagation delay times associated with said signals received during said at least one over-the-air loop and for calculating distances to said remote station based upon said determined propagation delay times, said propagation delay times being calculated based upon a difference between said expected duration of said at least one over-the-air loop and a measured duration of said at least one over-the-air loop.

17. The wireless communications network of claim 16, further comprising:

processing circuitry for determining at least one possible location for said at least one remote station based upon said calculated distances.

18. A method for determining a location of a remote station, comprising:

establishing communications between a remote station and a plurality of base stations using signals sent within at least one over-the-air loop;

determining propagation delay times associated with said signals sent within said at least one over-the-air loop, said propagation delay times being determined based at least in part upon a difference between an expected duration of said at least one over-the-air loop and a measured duration of said at least one over-the-air loop; and determining at least one possible location of said remote station based upon said determined propagation delay times.

* * * * *